(12) United States Patent
Roseberry

(10) Patent No.: US 9,757,981 B2
(45) Date of Patent: Sep. 12, 2017

(54) BROKEN AXLE RECOVERY APPARATUS

(71) Applicant: David L. Roseberry, Ammon, ID (US)

(72) Inventor: David L. Roseberry, Ammon, ID (US)

( * ) Notice: Subject to any disclaimer, the term of this patent is extended or adjusted under 35 U.S.C. 154(b) by 0 days.

(21) Appl. No.: 14/852,183

(22) Filed: Sep. 11, 2015

(65) Prior Publication Data

US 2016/0075178 A1 Mar. 17, 2016

Related U.S. Application Data

(60) Provisional application No. 62/049,155, filed on Sep. 11, 2014.

(51) Int. Cl.
| | |
|---|---|
| *B60B 35/14* | (2006.01) |
| *B60B 35/04* | (2006.01) |
| *B60B 27/02* | (2006.01) |
| *B60B 27/00* | (2006.01) |
| *B60B 7/00* | (2006.01) |
| *B60B 35/02* | (2006.01) |
| *B60B 35/08* | (2006.01) |

(52) U.S. Cl.
CPC ............ *B60B 35/14* (2013.01); *B60B 27/001* (2013.01); *B60B 27/02* (2013.01); *B60B 35/04* (2013.01); *B60B 7/0013* (2013.01); *B60B 35/025* (2013.01); *B60B 35/08* (2013.01); *B60B 2900/541* (2013.01); *B60B 2900/731* (2013.01)

(58) Field of Classification Search
CPC ......... B60B 35/00; B60B 35/04; B60B 35/14; B60B 2900/541; B60B 2500/731; B60B 27/02; B60B 27/001

USPC ............................................. 301/130, 111.04
See application file for complete search history.

(56) References Cited

U.S. PATENT DOCUMENTS

| | | | | |
|---|---|---|---|---|
| 1,410,863 | A * | 3/1922 | Woodson | B60B 35/02 301/130 |
| 1,480,462 | A * | 1/1924 | Owen | B60B 35/14 180/906 |
| 1,521,934 | A * | 1/1925 | Eicher | B60B 35/025 301/130 |
| 1,547,055 | A * | 7/1925 | McCarty | B60T 1/06 188/2 R |
| 1,580,472 | A * | 4/1926 | Duemler | B60B 35/14 301/130 |
| 4,486,052 | A * | 12/1984 | Taggart, Jr. | B60B 27/02 16/30 |
| 7,108,336 | B2 * | 9/2006 | Dombroski | B60B 35/14 29/402.13 |

(Continued)

FOREIGN PATENT DOCUMENTS

GB 254860 A * 7/1926 ............. B60B 35/14

*Primary Examiner* — Kip T Kotter

(57) ABSTRACT

A broken axle recovery apparatus that provides a temporary solution for a broken semi floating rear axle shaft has a wheel hub, a backing plate and a bearing. The wheel hub is rotatably engaged with the backing plate via the bearing in such a way that the broken axle recovery apparatus enables a rear wheel to be functionally mounted onto a vehicle. The backing plate is mounted to an axle housing of the vehicle, and the rear wheel is rotatably mounted to the wheel hub. The bearing enables the wheel hub and the rear wheel to freely rotate about the axle housing so that the vehicle can be safely driven into a safe location or a mechanic shop.

20 Claims, 5 Drawing Sheets

(56) References Cited

U.S. PATENT DOCUMENTS 7,832,812 B1 * 11/2010 Scott ..................... B60B 11/10
301/111.04

* cited by examiner

BROKEN AXLE RECOVERY APPARATUS

The current application claims a priority to the U.S. Provisional Patent application Ser. No. 62/049,155 filed on Sep. 11, 2014.

FIELD OF THE INVENTION

The present invention relates generally to an apparatus for temporarily repairing a vehicle. More specifically, the present invention is a broken axle recovery apparatus that temporarily repairs a broken rear-axle of the vehicle.

BACKGROUND OF THE INVENTION

Routine service maintenance are done to vehicles so that the vehicles can maintain good operating conditions. However, vehicles can still breakdown due to parts failure or unexpected incidents. For example, one of the common problem a vehicle might have is a flat tire. In order to solve the flat tire problem, automobile manufactures have equipped each vehicles with a spare tire so that the spare tire can be used to drive the vehicle to a safe location or to mechanic shop. In reference to off-roading vehicles that have a semi floating rear axle shaft, the rear axle tends to break during off-roading activities. A broken rear axle can cause a vehicle to be stranded in a remote area until the broken axle is fixed. Additionally, a broken axle can cause damage to additional differential parts if the vehicle is driven without proper parts to keep the rear wheel in place. Currently, there is not a functional apparatus for a broken semi floating rear axle shaft in the automobile industry that can be used as a temporary solution until the broken semi floating axle shaft is properly fixed by a mechanic.

It is an object of the present invention to provide a broken axle recovery apparatus for a semi floating rear axle shaft so that the vehicle can be temporarily fixed to dive to a safe location or a mechanic shop. The present invention functions similar to a spare tire in its use and needs to be placed within the vehicle so that the present invention can be utilized when necessary. More specifically, the present invention allows the operator of the vehicle to efficiently and functionally mount the loss rear wheel into the vehicle so that the vehicle can be driven with the front wheels. Additionally, the present invention also protects the other related parts of the broken axle for the duration of the transportation, saving additional repair costs for the owner of the vehicle.

DETAIL DESCRIPTIONS OF THE INVENTION

All illustrations of the drawings are for the purpose of describing selected versions of the present invention and are not intended to limit the scope of the present invention.

Figure 1:
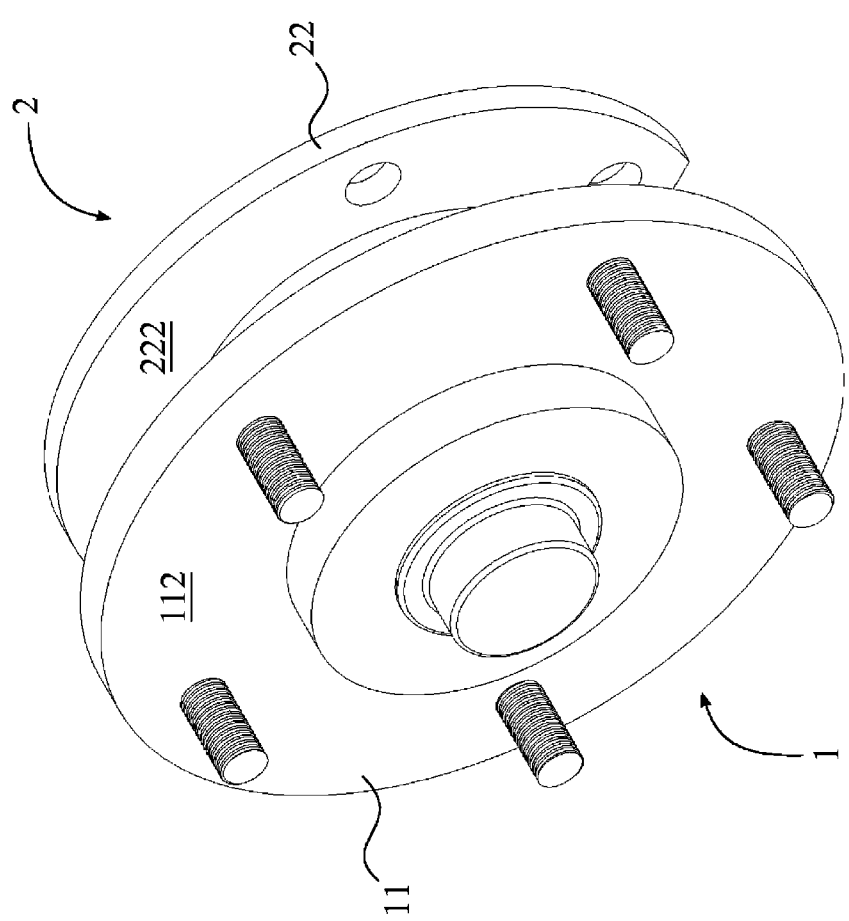
FIG. 1 is a perspective view of the present invention.
Figure 2:
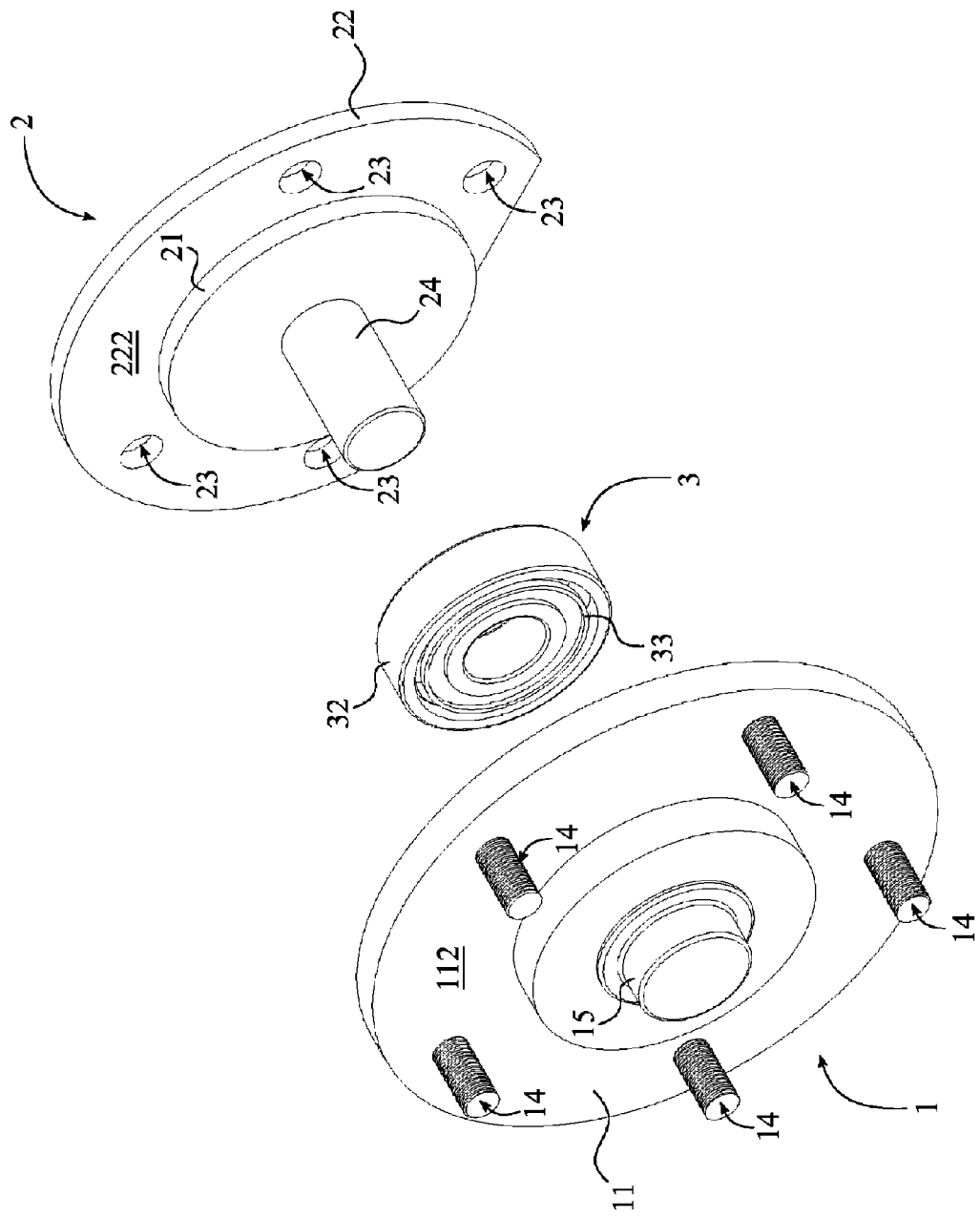
FIG. 2 is a perspective exploded view of the present invention.
Figure 5:
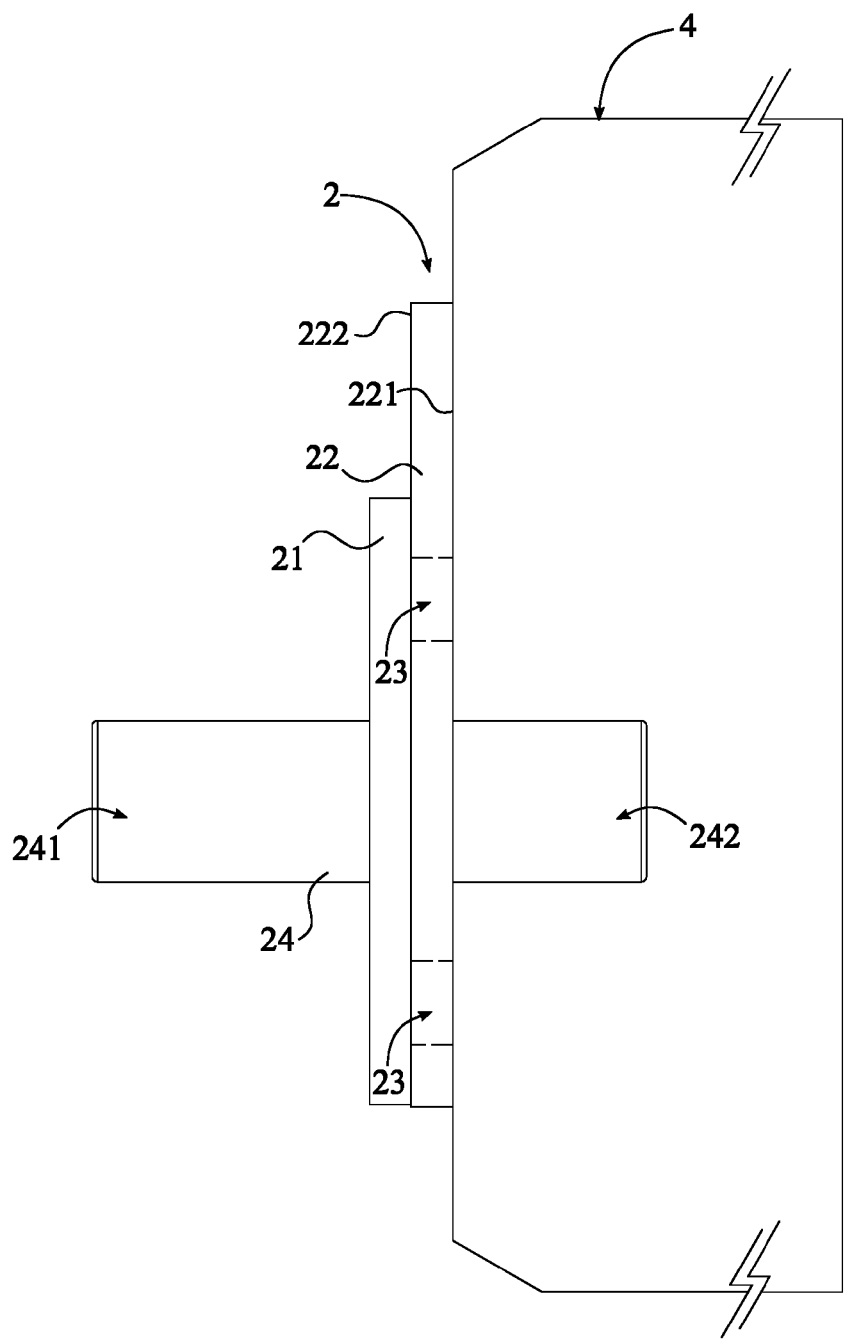
FIG. 5 is a side view of a backing plate of the present invention.

The present invention is a broken axle recovery apparatus that provides a temporary solution for a broken semi floating rear axle shaft. The present invention intends to replace the broken semi floating rear axle shaft that is connected to the differential assembly of a vehicle through a c-clip. More specifically, the semi floating rear axle shaft engages with the differential pinion gear and is connected to the differential assembly within the differential housing through the c-clip. When the semi floating rear axle shaft is broken into two separate sections, the first broken section that is engaged with the differential pinion gear stays within the axle housing while the second broken section along with the associated rear wheel gets thrust out of the axle housing as the second broken section and the associated rear wheel have no other physical connections to the vehicle. The present invention is then utilized between the axle housing and the rear wheel so that the vehicle can be driven into a safe location or a mechanic shop. The present invention provides a temporary solution to the operator of the vehicle until the differential assembly can be repaired with a new semi floating rear axle shaft. In reference to FIG. 1 and FIG. 2, the present invention comprises a wheel hub 1, a backing plate 2, and a bearing 3, wherein the backing plate 2 is utilized to mount the present invention to the axle housing 4 (as shown in FIG. 5) while the wheel hub 1 is utilized to mount the rear wheel to the present invention. Then the rear wheel is able to freely rotate about a rotational axis of the wheel hub 1 as the wheel hub 1 is axially and rotatably engaged with the backing plate 2 through the bearing 3.

Figure 3:
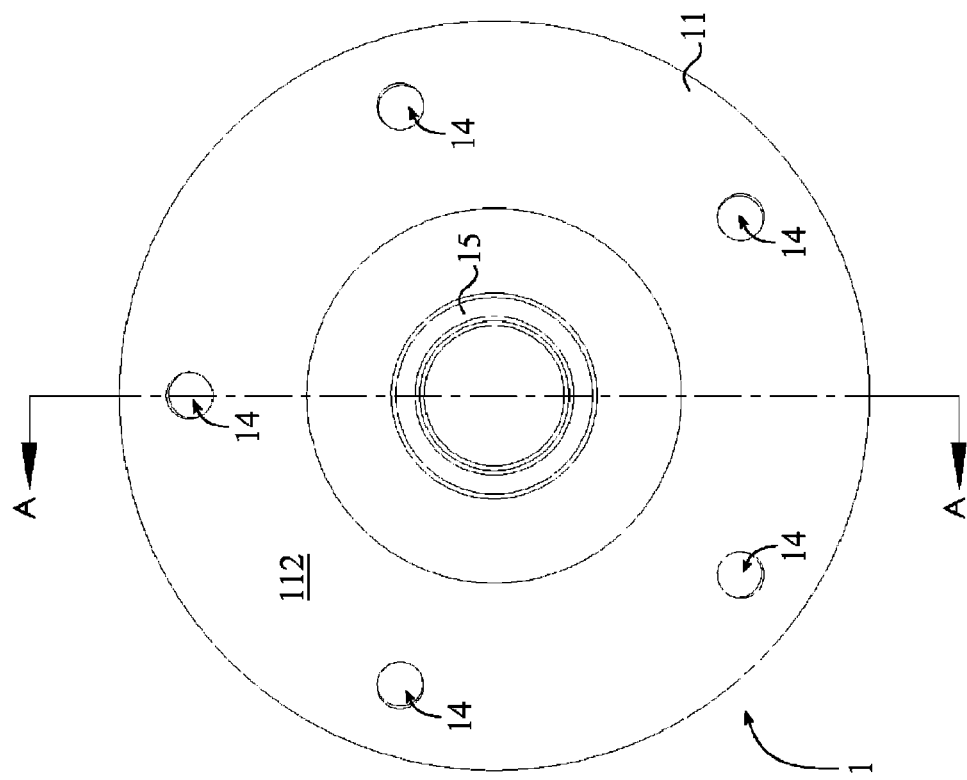
FIG. 3 is a front view of a wheel hub of the present invention, showing the plane upon which a cross sectional view is taken shown in FIG. 4.

The wheel hub 1 that accepts the rear wheel of the vehicle functions similar to an existing wheel hub assembly of the vehicle; however, the wheel hub 1 of the present invention is not engaged with the differential assembly. In reference to FIG. 3 and FIG. 4, the wheel hub 1 comprises an annular plate 11, an axle opening 13, a neck flange 12, a plurality of hub bolts 14, and a hub cap 15. The neck flange 12 is adjacent positioned with an inner surface 111 of the annular plate 11 as both the neck flange 12 and the annular plate 11 are concentric to each other. The neck flange 12 and the annular plate 11 delineate shape of wheel hub 1 and function as the main body so that the other related components of the wheel hub 1 can be placed or positioned.

The annular plate 11 is shaped to match the hub of the rear wheel so that the rear wheel can be precisely mounted to the wheel hub 1 through the plurality of hub bolts 14. The plurality of hub bolts 14 is radially positioned around the neck flange 12 and traversed through the annular plate 11, where the bolt pattern of the plurality of hub bolts 14 aligns with the bolt pattern of the rear wheel. In reference to FIG. 4, each of the plurality of hub bolts 14 comprises a bolt head 141 and a shank 142. In order to properly mount the rear wheel to the wheel hub 1 where the rear wheel is not interfered with the backing plate 2, the bolt head 141 is adjacently positioned with the inner surface 111 of the annular plate 11 so that the shank 142 can be extended toward an outer surface 112 of the annular plate 11. More specifically, a non-threaded section 143 of the shank 142 is internally positioned with the annular plate 11 while a threaded section 144 of the shank 142, which accepts the lug nut, is adjacently positioned with the outer surface 112 of the annular plate 11.

Figure 4:
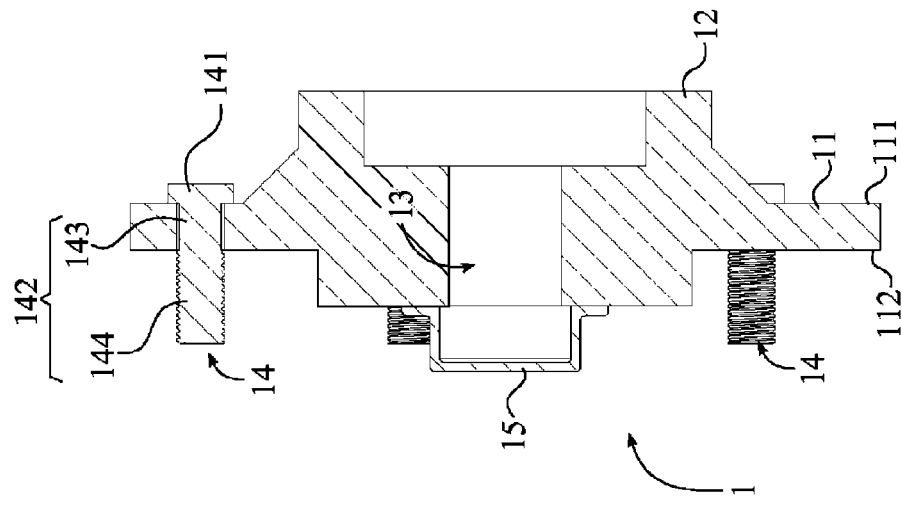
FIG. 4 is a cross section view of the wheel hub of the present invention taken along line A-A of FIG. 3.
Figure 7:
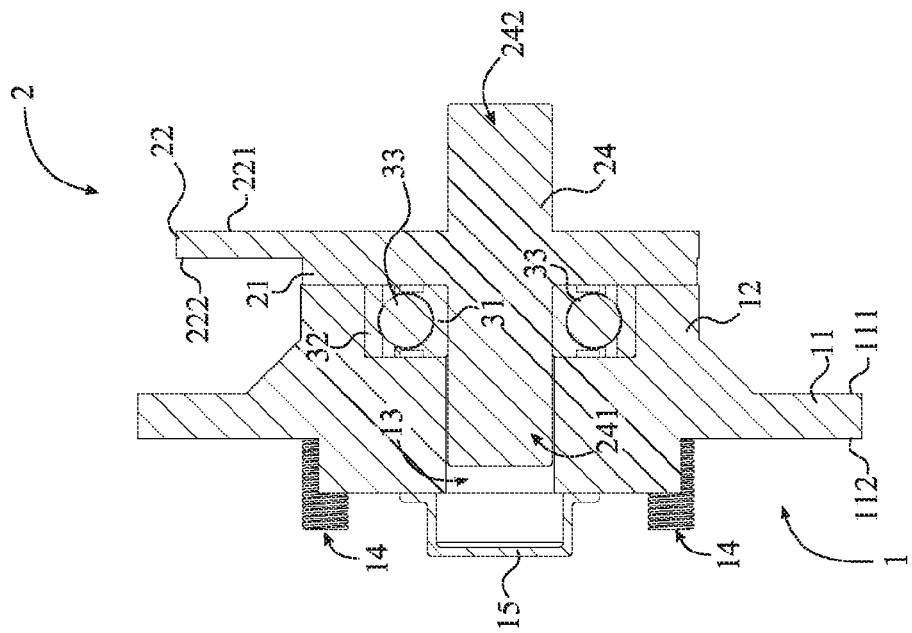
FIG. 7 is a cross section view of the present invention taken along line A-A of FIG. 6.
Figure 6:
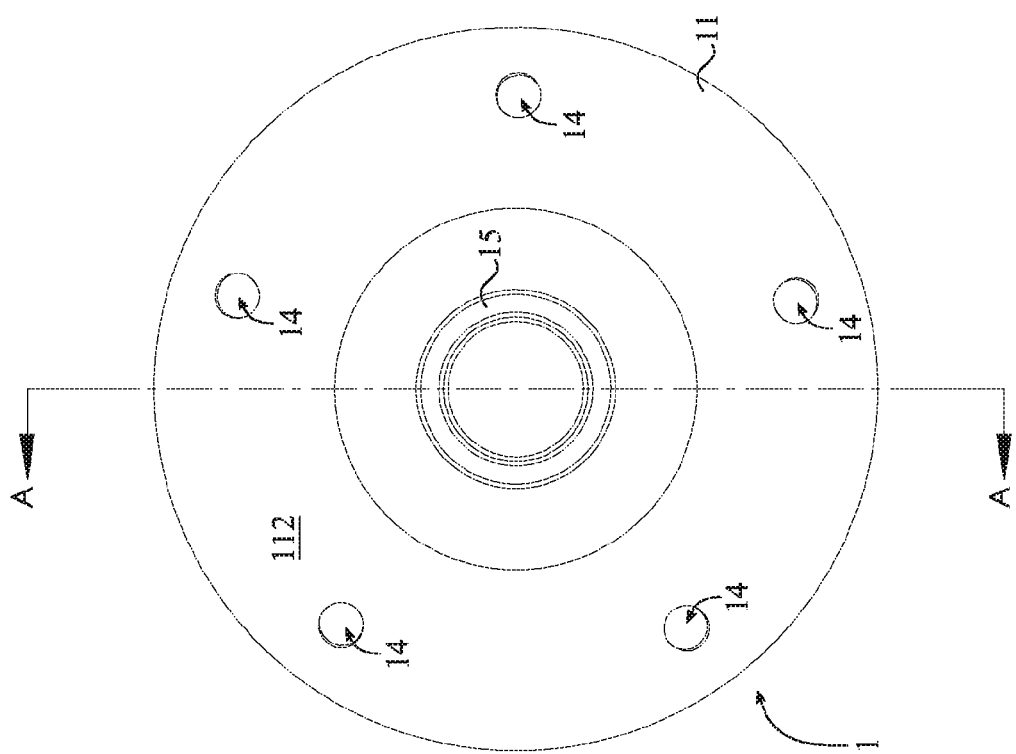
FIG. 6 is a front view of the present invention, showing the plane upon which a cross sectional view is taken shown in FIG. 7.

In reference to FIG. 4, FIG. 6, and FIG. 7, the axle opening 13 is traversed through the outer surface 112 of the annular plate 11 to the neck flange 12 so that a plate axle 24 of the backing plate 2 can be positioned within the wheel hub 1. The hub cap 15 is adjacently positioned around the axle opening 13, opposite of the neck flange 12 so that the hub cap 15 is able to provide a dustproof and a water-proof environment for the bearing 3 and the plate axle 24.

In reference to FIG. 7, the neck flange 12 provides sufficient retaining area for the bearing 3 so that the bearing 3 can be positioned flush with the neck flange 12. More specifically, an outer race 32 of the bearing 3 is internally and concentrically mounted within the neck flange 12 in such a way that the outer race 32 and the neck flange 12 simultaneously rotate around the rotational axis of the wheel hub 1.

The backing plate 2 mounts the present invention to the axle housing 4 so that the wheel hub 1 is able to freely rotate around the rotational axis of the wheel hub 1 while the backing plate 2 stays stationary with the axle housing. In reference to FIG. 5, the backing plate 2 comprises a raised flange 21, an outer lip 22, and a plurality of fastener holes 23 in addition to the plate axle 24. The raised flange 21 is concentrically positioned with the outer lip 22, adjacent to an outer surface 222 of the outer lip 22, while the plate axle 24 concentrically traverses through the outer lip 22 and the raised flange 21.

The outer lip 22 radially extends about the raised flange 21 so that the outer lip 22 can be utilized to secure the present invention to the axle housing. The shape of the outer lip 22 is determined upon a mounting surface of the axle housing 4 so that outer lip 22 can be aligned flush with the mounting surface. In reference to FIG. 2, the plurality of fastener holes 23 is radially positioned around the raised flange 21 and traversed through the outer lip 22 so that the plurality of fastener holes 23 can align with the existing holes of the axle housing. As a result, the backing plate 2 can be mounted onto the axle housing 4 through the plurality of fastener holes 23. Additionally, the backing plate 2 is then able to protect the inner components of the axle housing 4 from outside elements such as dust and water.

The raised flange 21 preferably comprises the same diameter as the neck flange 12 so that the wheel hub 1 is able to evenly press against the backing plate 2. In reference to FIG. 5-7, a first end 241 of the plate axle 24 is adjacently positioned with the raised flange 21 and extends from the outer surface 222 of the outer lip 22. The first end 241 is positioned within the axle opening 13 when the backing plate 2 is engaged with the wheel hub 1 so that the plate axle 24 is able to provide a steady rotational movement for the wheel hub 1 while maintaining the structural integrity of the present invention. More specifically, an inner race 31 of the bearing 3 is externally and concentrically mounted around the first end 241, resulting the outer race 32 to rotatably engage with the inner race 31 through a plurality of rollers 33 of the bearing 3.

In reference to FIG. 5, a second end 242 of the plate axle 24 is adjacently positioned with the outer lip 22, opposite of the first end 241, as the second end 242 is extended from an inner surface 221 of the outer lip 22. When the present invention is mounted to the axle housing, the second end 242 is positioned within the axle housing 4 and engaged within an outer bearing of the axle housing 4 to provide a secure connection between the axle housing 4 and the present invention.

Although the invention has been explained in relation to its preferred embodiment, it is to be understood that many other possible modifications and variations can be made without departing from the spirit and scope of the invention as hereinafter claimed.

What is claimed is:

1. A broken axle recovery apparatus comprising:
    a wheel hub;
    a backing plate;
    a bearing;
    the bearing being positioned in between the wheel hub and the backing plate;
    the wheel hub being axially and rotatably engaged with the backing plate via the bearing;
    the wheel hub comprising an annular plate and a neck flange;
    the backing plate comprising a raised flange, an outer lip, and a plate axle;
    the neck flange being concentrically positioned with the annular plate, adjacent to an inner surface of the annular plate;
    the raised flange being concentrically positioned with the outer lip, adjacent to an outer surface of the outer lip;
    the plate axle concentrically traversing through the outer lip and the raised flange;
    the neck flange being axially engaged with the raised flange; and
    the neck flange being rotatably engaged with a first end of the plate axle via the bearing.

2. The broken axle recovery apparatus as claimed in claim 1 comprising:
    the wheel hub comprising an axle opening and a hub cap;
    the axle opening traversing from an outer surface of the annular plate to the neck flange; and
    the hub cap being adjacently positioned around the axle opening, opposite of the neck flange.

3. The broken axle recovery apparatus as claimed in claim 1 comprising:
    the wheel hub comprising a plurality of hub bolts;
    the plurality of hub bolts being radially positioned around the neck flange; and
    the plurality of hub bolts traversing through the annular plate.

4. The broken axle recovery apparatus as claimed in claim 3 comprising:
    each of the plurality of hub bolts comprising a bolt head and a shank;
    the shank comprising a non-threaded section and a threaded section;
    the non-threaded section being connected in between the bolt head and the threaded section;
    the bolt head being adjacently positioned with the inner surface of the annular plate;
    the non-threaded section traversing through the annular plate; and
    the threaded section being adjacently positioned with an outer surface of the annular plate.

5. The broken axle recovery apparatus as claimed in claim 1 comprising:
    the first end of the plate axle being adjacently positioned with the raised flange;
    the first end being extended from the outer surface of the outer lip;
    a second end of the plate axle being adjacently positioned with the outer lip, opposite of the first end of the plate axle; and
    the second end being extended from an inner surface of the outer lip.

6. The broken axle recovery apparatus as claimed in claim 1 comprising:
the backing plate comprising a plurality of fastener holes;
the plurality of fastener holes being radially positioned around the raised flange; and
the plurality of fastener holes traversing through the outer lip.

7. The broken axle recovery apparatus as claimed in claim 6, wherein the backing plate is adapted to be mounted onto an axle housing of a vehicle through the plurality of fastener holes.

8. The broken axle recovery apparatus as claimed in claim 1 comprising:
the bearing comprising an inner race, an outer race, and a plurality of rollers;
the outer race being internally and concentrically mounted within the neck flange;
the inner race being externally and concentrically mounted around the first end of the plate axle; and
the outer race and the inner race being rotatably engaged with each other by the plurality of rollers.

9. A broken axle recovery apparatus comprising:
a wheel hub;
a backing plate;
a bearing;
the bearing being positioned in between the wheel hub and the backing plate;
the wheel hub being axially and rotatably engaged with the backing plate via the bearing;
the wheel hub comprising an annular plate, a neck flange, and a plurality of hub bolts;
the backing plate comprising a raised flange, an outer lip, and a plate axle;
the neck flange being concentrically positioned with the annular plate, adjacent to an inner surface of the annular plate;
the plurality of hub bolts being radially positioned around the neck flange;
the plurality of hub bolts traversing through the annular plate;
the raised flange being concentrically positioned with the outer lip, adjacent to an outer surface of the outer lip;
the plate axle concentrically traversing through the outer lip and the raised flange;
the neck flange being axially engaged with the raised flange; and
the neck flange being rotatably engaged with a first end of the plate axle via the bearing.

10. The broken axle recovery apparatus as claimed in claim 9 comprising:
the wheel hub comprising an axle opening and a hub cap;
the axle opening traversing from an outer surface of the annular plate to the neck flange; and
the hub cap being adjacently positioned around the axle opening, opposite of the neck flange.

11. The broken axle recovery apparatus as claimed in claim 9 comprising:
each of the plurality of hub bolts comprising a bolt head and a shank;
the shank comprising a non-threaded section and a threaded section;
the non-threaded section being connected in between the bolt head and the threaded section;
the bolt head being adjacently positioned with the inner surface of the annular plate;
the non-threaded section traversing through the annular plate; and
the threaded section being adjacently positioned with an outer surface of the annular plate.

12. The broken axle recovery apparatus as claimed in claim 9 comprising:
the first end of the plate axle being adjacently positioned with the raised flange;
the first end being extended from the outer surface of the outer lip;
a second end of the plate axle being adjacently positioned with the outer lip, opposite of the first end of the plate axle; and
the second end being extended from an inner surface of the outer lip.

13. The broken axle recovery apparatus as claimed in claim 9 comprising:
the backing plate further comprising a plurality of fastener holes;
the plurality of fastener holes being radially positioned around the raised flange; and
the plurality of fastener holes traversing through the outer lip.

14. The broken axle recovery apparatus as claimed in claim 13, wherein the backing plate is adapted to be mounted onto an axle housing of a vehicle through the plurality of fastener holes.

15. The broken axle recovery apparatus as claimed in claim 9 comprising:
the bearing comprising an inner race, an outer race, and a plurality of rollers;
the outer race being internally and concentrically mounted within the neck flange;
the inner race being externally and concentrically mounted around the first end of the plate axle; and
the outer race and the inner race being rotatably engaged with each other by the plurality of rollers.

16. A broken axle recovery apparatus comprising:
a wheel hub;
a backing plate;
a bearing;
the bearing being positioned in between the wheel hub and the backing plate;
the wheel hub being axially and rotatably engaged with the backing plate via the bearing;
the wheel hub comprising an annular plate, a neck flange, and a plurality of hub bolts;
the backing plate comprising a raised flange, an outer lip, a plate axle, and a plurality of fastener holes;
the neck flange being concentrically positioned with the annular plate, adjacent to an inner surface of the annular plate;
the plurality of hub bolts being radially positioned around the neck flange;
the plurality of hub bolts traversing through the annular plate;
the raised flange being concentrically positioned with the outer lip, adjacent to an outer surface of the outer lip;
the plate axle concentrically traversing through the outer lip and the raised flange;
the plurality of fastener holes being radially positioned around the raised flange;
the plurality of fastener holes traversing through the outer lip;
the neck flange being axially engaged with the raised flange; and
the neck flange being rotatably engaged with a first end of the plate axle via the bearing.

17. The broken axle recovery apparatus as claimed in claim 16 comprising:
the wheel hub comprising an axle opening and a hub cap;
the axle opening traversing from an outer surface of the annular plate to the neck flange; and
the hub cap being adjacently positioned around the axle opening, opposite of the neck flange.

18. The broken axle recovery apparatus as claimed in claim 16 comprising:
each of the plurality of hub bolts comprising a bolt head and a shank;
the shank comprising a non-threaded section and a threaded section;
the non-threaded section being connected in between the bolt head and the threaded section;
the bolt head being adjacently positioned with the inner surface of the annular plate;
the non-threaded section traversing through the annular plate; and
the threaded section being adjacently positioned with an outer surface of the annular plate.

19. The broken axle recovery apparatus as claimed in claim 16 comprising:
the first end of the plate axle being adjacently positioned with the raised flange;
the first end being extended from the outer surface of the outer lip;
a second end of the plate axle being adjacently positioned with the outer lip, opposite of the first end of the plate axle; and
the second end being extended from an inner surface of the outer lip.

20. The broken axle recovery apparatus as claimed in claim 16 comprising:
the bearing comprising an inner race, an outer race, and a plurality of rollers;
the outer race being internally and concentrically mounted within the neck flange;
the inner race being externally and concentrically mounted around the first end of the plate axle; and
the outer race and the inner race being rotatably engaged with each other by the plurality of rollers.

\* \* \* \* \*